(12) United States Patent
Mani

(10) Patent No.: US 9,567,947 B2
(45) Date of Patent: Feb. 14, 2017

(54) VAPORIZED FUEL PROCESSING APPARATUS

(71) Applicant: AISAN KOGYO KABUSHIKI KAISHA, Obu-shi, Aichi-ken (JP)

(72) Inventor: Takashi Mani, Takahama (JP)

(73) Assignee: AISIN KOGYO KABUSHIKI KAISHA, Obu-Shi, Aichi-Ken (JP)

(*) Notice: Subject to any disclaimer, the term of this patent is extended or adjusted under 35 U.S.C. 154(b) by 0 days.

(21) Appl. No.: 14/820,854

(22) Filed: Aug. 7, 2015

(65) Prior Publication Data

US 2016/0040631 A1 Feb. 11, 2016

(30) Foreign Application Priority Data

Aug. 8, 2014 (JP) .................. 2014-162302

(51) Int. Cl.
*F02M 25/08* (2006.01)
*B01D 53/04* (2006.01)

(52) U.S. Cl.
CPC .......... *F02M 25/0854* (2013.01); *B01D 53/04* (2013.01); *B01D 2259/4516* (2013.01)

(58) Field of Classification Search
CPC ............ B01D 53/04; B01D 2259/4516; F02M 25/0854
USPC ............................................ 96/147; 123/519
See application file for complete search history.

(56) References Cited

U.S. PATENT DOCUMENTS

| 5,912,368 A * | 6/1999 | Satarino ................. B01D 45/08 55/320 |
| 2009/0132147 A1* | 5/2009 | Jensen .................. F02D 41/004 701/102 |
| 2011/0315126 A1 | 12/2011 | Yoshida et al. |
| 2013/0319247 A1 | 12/2013 | Yamamoto |

FOREIGN PATENT DOCUMENTS

| JP | 2000-240516 A | 9/2000 |
| JP | 2006-299849 A | 11/2006 |
| JP | 2012-7501 A | 1/2012 |
| JP | 2013-249752 A | 12/2013 |

* cited by examiner

*Primary Examiner* — Frank Lawrence
(74) *Attorney, Agent, or Firm* — Conley Rose, P.C.

(57) ABSTRACT

A vaporized fuel processing apparatus for a vehicle having a fuel tank has a casing filled with an adsorbent and having a first outer surface. The casing has first ribs protruding from the first outer surface and extending without intersecting with each other. The casing has at least one second rib protruding from the first outer surface. At least one pair of the first ribs adjacent to each other are connected with each other via one of the second ribs only. The other pairs of the first ribs adjacent to each other are connected with each other via one of the second ribs only or are not connected with each other via any one of the second ribs.

9 Claims, 10 Drawing Sheets

VAPORIZED FUEL PROCESSING APPARATUS

CROSS-REFERENCE TO RELATED APPLICATIONS

This application claims priority to Japanese patent application serial number 2014-162302, filed Aug. 8, 2014, the contents of which are incorporated herein by reference.

STATEMENT REGARDING FEDERALLY SPONSORED RESEARCH OR DEVELOPMENT

Not applicable.

BACKGROUND

This disclosure relates to a vaporized fuel processing apparatus for processing vaporized fuel, which has been vaporized in a fuel tank.

A canister is used for a conventional vaporized fuel processing apparatus. The canister is configured to adsorb gasoline vapor (vaporized fuel) vaporized in the fuel tank and to release and deliver the gasoline vapor to an internal combustion engine under a predetermined condition. The canister has a casing and an adsorbent filled in the casing. The casing has a tank port for receiving the gasoline vapor, a purge port for delivering the gasoline vapor, and an atmospheric port for communicating with the atmosphere. The adsorbent is made from, for example, activated carbon capable of adsorbing and desorbing the gasoline vapor.

In some cases, the casing of the vaporized fuel processing apparatus has a plurality of ribs around the casing as disclosed in Japanese Laid-Open Patent Publication No. 2013-249752. These ribs are provided for improving grasp of the casing by hand and for improving the rigidity and/or the heat exchanging performance of the casing. However, when the casing has many ribs around the circumference of the casing, in some cases, the ribs surround an area on a surface of the circumference of the casing. When the casing is placed such that the surface faces upward, there is a possibility that a liquid such as water accumulates in the area surrounded by the ribs. Accordingly, there has been a need for an improved vaporized fuel processing apparatus.

BRIEF SUMMARY

In one aspect of this disclosure, a vaporized fuel processing apparatus for a vehicle having a fuel tank has a casing filled with an adsorbent and having a first outer surface. The casing has first ribs protruding from the first outer surface and extending without intersecting with each other. The casing has at least one second rib protruding from the first outer surface. At least one pair of the first ribs adjacent to each other are connected with each other via one of the second ribs only. The other pairs of the first ribs adjacent to each other are connected with each other via one of the second ribs only or are not connected with each other via any one of the second ribs.

According to the aspect of this disclosure, because the pairs of the first ribs adjacent to each other are connected with each other via one of the second ribs only or are not connected with each other, the ribs do not surround an area on the first outer surface. Thus, when liquid such as water drops on the first outer surface, the liquid does not remain on the first outer surface. Therefore, it is able to prevent deterioration of the casing caused by the liquid.

DETAILED DESCRIPTION

Figure 1:
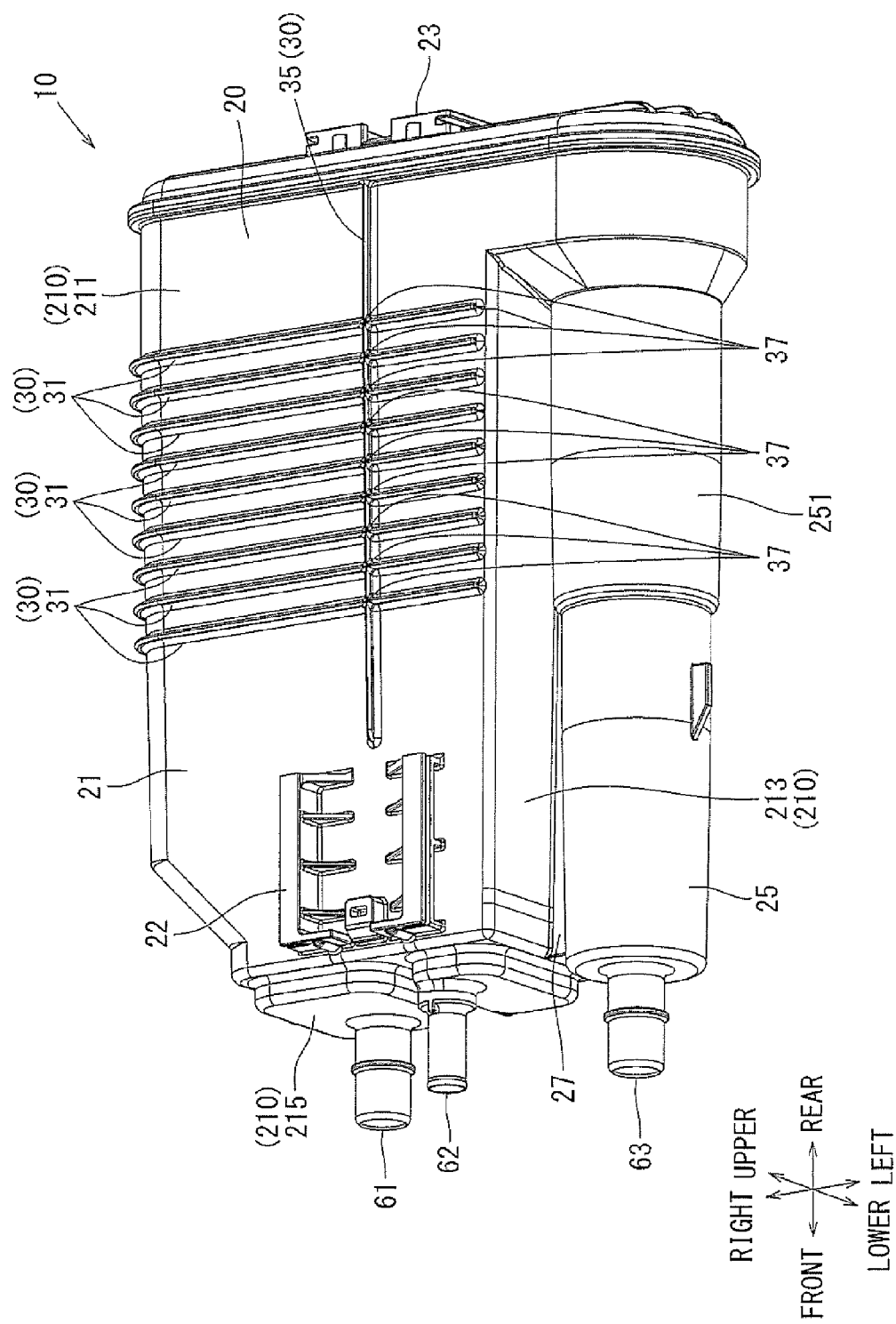
FIG. 1 is a perspective view of an upper side of a canister according to a first embodiment.

Each of the additional features and teachings disclosed above and below may be utilized separately or in conjunction with other features and teachings to provide improved vaporized fuel processing apparatuses. Representative examples, which utilize many of these additional features and teachings both separately and in conjunction with one another, will now be described in detail with reference to the attached drawings. This detailed description is merely intended to teach a person of skilled in the art further details for practicing preferred aspects of the present teachings and is not intended to limit the scope of the invention. Only the claims define the scope of the claimed invention. Therefore, combinations of features and steps disclosed in the following detailed description may not be necessary in the broadest sense, and are instead taught merely to particularly describe representative examples. Moreover, various features of the representative examples and the dependent claims may be combined in ways that are not specifically enumerated in order to provide additional useful embodiments of the present teachings.

A canister 10 according to a first embodiment will be described in reference to FIGS. 1-8. The canister 10 is mounted on a vehicle such as automobile and is configured to process gasoline vapor vaporized in a fuel tank of the vehicle. The gasoline vapor is one kind of vaporized fuels. The canister 10 is horizontally mounted on the vehicle based on directions shown in the drawings. The directions of the canister 10 and the vehicle are defined based on the directions shown in the drawings.

The canister 10 has a hollow casing 20. An adsorbent (not shown) is filled in the casing 20. The adsorbent is, for example, a granular activated carbon. The adsorbent is capable of adsorbing and desorbing the gasoline vapor.

The casing 20 has a tank port 61, a purge port 62, and an atmospheric port 63, which communicate the inside of the casing 20 with the outside of the casing 20, respectively. In detail, the tank port 61 is connected to the fuel tank via a pipe (not shown) and is configured to introduce the gasoline vapor from the fuel tank into the canister 10. The purge port 62 is connected to an internal combustion engine via a pipe (not shown) and is configured to send the gasoline vapor to the outside (i.e., to the internal combustion engine). The atmospheric port 63 is connected to an outside air vent via a pipe (not shown) and is configured to communicate the canister 10 with the atmosphere.

As shown in FIGS. 1-6, the three ports 61, 62 and 63 open in the same direction, that is, in a front direction. The casing 20 has a primary case body 21 and an auxiliary case body 25. The primary case body 21 has the tank port 61 and the purge port 62. The auxiliary case body 25 has the atmospheric port 63. The canister 10 defines a U-shaped flow passage therein. As gasoline vapor or air flows through the U-shaped flow passage, the gasoline vapor is adsorbed on or desorbed from the adsorbent. In detail, in order to adsorb the gasoline vapor on the adsorbent, the gasoline vapor is flowed into the casing 20 through the tank port 61, is flowed rearward through the primary case body 21, is flowed forward through the auxiliary case body 25, and then is discharged from the atmospheric port 63 as shown by an arrow F1 in FIG. 3. In order to desorb the gasoline vapor from the adsorbent, air is flowed into the casing 20 through the atmospheric port 63, is flowed rearward through the auxiliary case body 25, is flowed forward through the primary case body 21, and then is discharged from the purge port 62 as shown by an arrow F2 in FIG. 4. That is, the tank port 61, the purge port 62 and the atmospheric port 63 are positioned along the U-shaped flow passage, in which the air and the gasoline vapor are flowed.

The casing 20 is made from high thermal conductive material such that the primary case body 21 and the auxiliary case body 25 are integrated with each other. As shown in FIG. 1, the casing 20 has a connection part 27 between the primary case body 21 and the auxiliary case body 25. The connection part 27 connects the primary case body 21 with the auxiliary case body 25. The primary case body 21 is formed in a substantial hollow cuboid shape, and the auxiliary case body 25 is formed in a substantial hollow cylindrical shape. The primary case body 21 has an outer peripheral surface 210 facing to the outside. The outer peripheral surface 210 of the primary case body 21 has an upper surface 211, a lower surface 212, a left surface 213 and a right surface 214 as shown in FIGS. 3-6. Further, the outer peripheral surface 210 of the primary case body 21 includes a front surface 215, in which the three ports 61, 62 and 63 are provided, and a rear surface 216 opposed to the front surface 215. The auxiliary case body 25 has a periphery cylindrical surface 251. The upper surface 211 of the primary case body 21 corresponds to "one surface of an outer peripheral surface" in this disclosure, and, the lower surface 212 of the primary case body 21 corresponds to "another surface of the outer peripheral surface" in this disclosure. Here, the lower surface 212 of the primary case body 21 is opposite to the upper surface 211 of the primary case body 21.

The primary case body 21 has a pair of front and rear bracket fixing members 22 and 23 for fixing the canister 10 on the vehicle. The bracket fixing members 22 and 23 are configured to be fixed on brackets (not shown), respectively, supported by a vehicle frame. The front bracket fixing member 22 is provided on the upper surface 211 of the primary case body 21. The rear bracket fixing member 23 is provided on the rear surface 216 of the primary case body 21. The front bracket fixing member 22 is positioned on the upper surface 211 and near the front surface 215 of the primary case body 21. That is, the front bracket fixing member 22 is positioned to be near the tank port 61 and the purge port 62. The rear bracket fixing member 23 is positioned at a substantial center of the rear surface 216 of the primary case body 21. When the front bracket fixing member 22 and the rear bracket fixing member 23 provided at the primary case body 21 are fixed on the brackets supported by the vehicle frame, the canister 10 is mounted on the vehicle by two points support of the vehicle frame.

The primary case body 21 has ribs 30 on the outer peripheral surface 210. In detail, the ribs 30 are provided on the upper surface 211, the lower surface 212, the right surface 214, and the rear surface 216 of the outer peripheral surface 210. These ribs 30 are provided in order to improve grasp of the casing by a hand and to improve the rigidity of the casing 20 and/or the heat exchanging performance of the casing 20 with the outside air.

Figure 3:
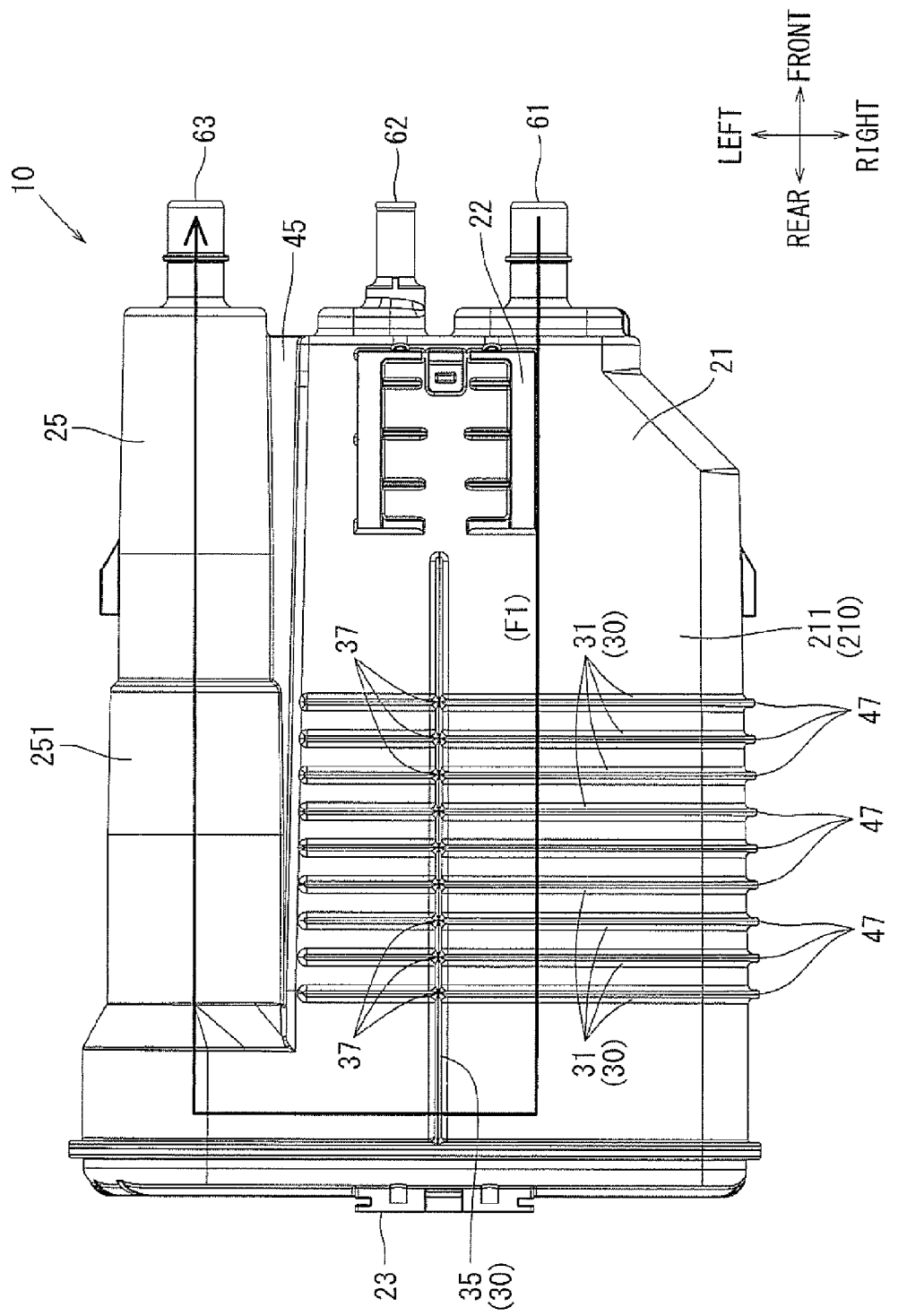
FIG. 3 is a plan view of the upper side of the canister.

As shown in FIGS. 1 and 3, on the upper surface 211 of the primary case body 21, the ribs 30 composed of nine parallel ribs 31 and a crossing rib 35 are provided. The parallel ribs 31 extend in the right and left direction and are arranged parallel to each other at regular intervals on the upper surface 211 of the primary case body 21. The parallel ribs 31 protrude upward from the upper surface 211 of the primary case body 21. Each of the parallel ribs 31 extends from a right end to a left end of the upper surface 211 of the primary case body 21 and is formed in a linear shape. That is, the parallel ribs 31 are provided throughout the upper surface 211 of the primary case body 21 in the right and left direction. The parallel ribs 31 are located near at a center of the upper surface 211 of the primary case body 21 in the front and rear direction. Because the nine parallel ribs 31 are parallel to each other, the parallel ribs 31 extend in the same direction, that is, in the right-left direction and do not cross each other. The direction where the parallel ribs 31 extend is perpendicular to the direction in which the tank port 61, the purge port 62 and the atmospheric port 63 are directed. That is, the right and left direction where the parallel ribs 31 extend is perpendicular to the flow directions F1 and F2 of the gasoline vapor.

The crossing rib 35 extends in the front and rear direction and is provided on the upper surface 211 of the primary case body 21. The crossing rib 35 protrudes upward from the upper surface 211 of the primary case body 21 and extends in a linear fashion in the front and rear direction. The crossing rib 35 intersects with the nine parallel ribs 31 and is perpendicular to the parallel ribs 31. That is, each pair of parallel ribs 31 adjacent to each other are connected with each other via only the crossing rib 35 and are not connected via any other rib. Here, the crossing rib 35 and each of the parallel ribs 31 are different from each other with respect to each direction. However, cross-sectional shapes and sizes of the crossing rib 35 and each parallel rib 31 are substantially same with each other. The crossing rib 35 protrudes upward from the upper surface 211 of the primary case body 21. The crossing rib 35 extends from a rear end of the upper surface 211 of the primary case body 21 to a rear side of the front bracket fixing member 22. That is, the crossing rib 35 extends throughout the upper surface 211 of the primary case body 21 except the front bracket fixing member 22 in the front and rear direction. That is, the front and rear direction where the crossing rib 35 extends is same direction in which the tank port 61, the purge port 62 and the atmospheric port 63 are directed. That is, the crossing rib 35 extends in the same direction of the flow directions F1 and F2 of the gasoline vapor. The crossing rib 35 extends between the front bracket fixing member 22 and the rear bracket fixing member 23 on the upper surface 211 of the primary case body 21. Because the crossing rib 35 perpendicularly intersects with the nine parallel ribs 31, nine intersection points 37 between the crossing rib 35 and each parallel rib 31 are positioned at regular intervals.

Figure 2:
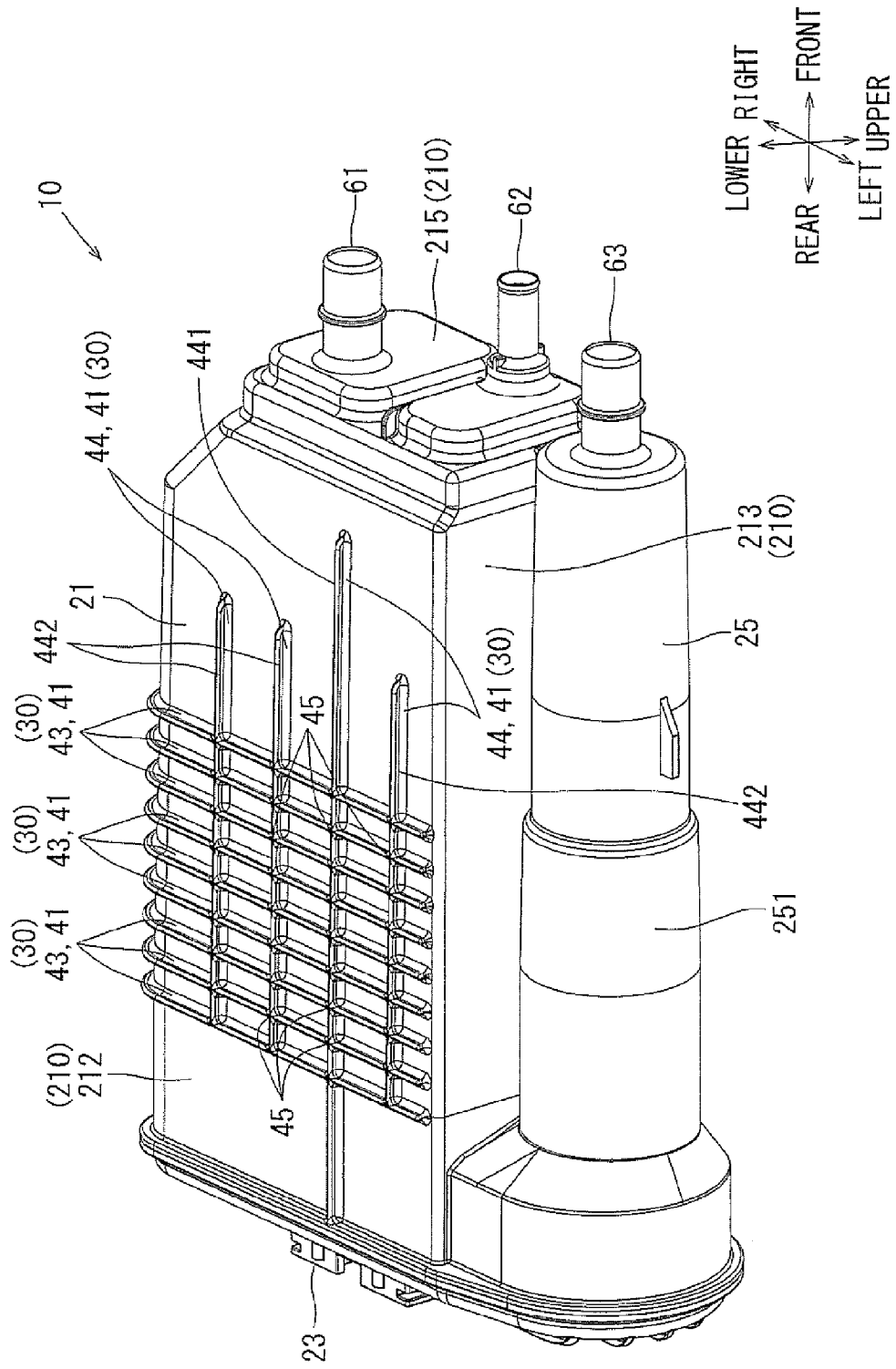
FIG. 2 is a perspective view of a lower side of the canister.
Figure 4:
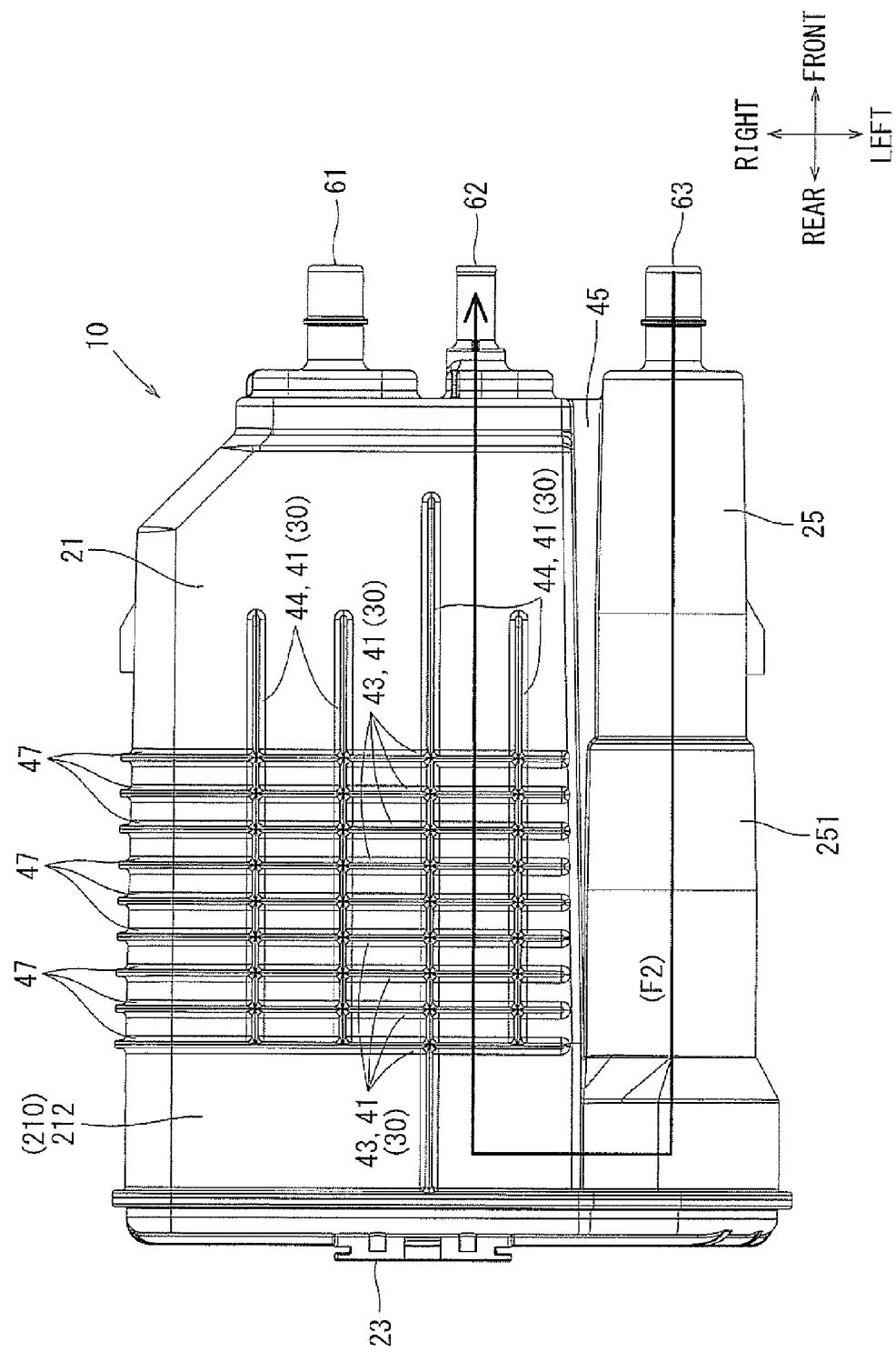
FIG. 4 is a plan view of the lower side of the canister.

As shown in FIGS. 2 and 4, a lattice rib 41, which is included in the ribs 30, is provided on the lower surface 212 of the primary case body 21. The lattice rib 41 protrudes downward from the lower surface 212 of the primary case body 21. The lattice rib 41 includes nine right-left ribs 43, which extend in the right and left direction and are arranged parallel to each other at regular intervals. Further, the lattice rib 41 includes four front-rear ribs 44, which extend in the front-rear direction and are arranged parallel to each other at regular intervals. The nine right-left ribs 43 intersect with the four front-rear ribs 44 such that the lattice shape of the lattice rib 41 is formed. The nine right-left ribs 43 and the four front-rear ribs 44 form thirty six intersection points 45, which are located at regular intervals. Each of the nine right-left ribs 43 is formed in the substantially same shape with each parallel rib 31. One of the four front-rear ribs 44, which is located near a center in the right and left direction, is referred to as "front-rear rib 441" and is formed in the substantially same shape with the crossing rib 35. As shown in FIG. 2, the other three front-rear ribs 442 among the front-rear ribs 44 are shorter than the front-rear rib 441 in the front and rear direction.

Figure 5:
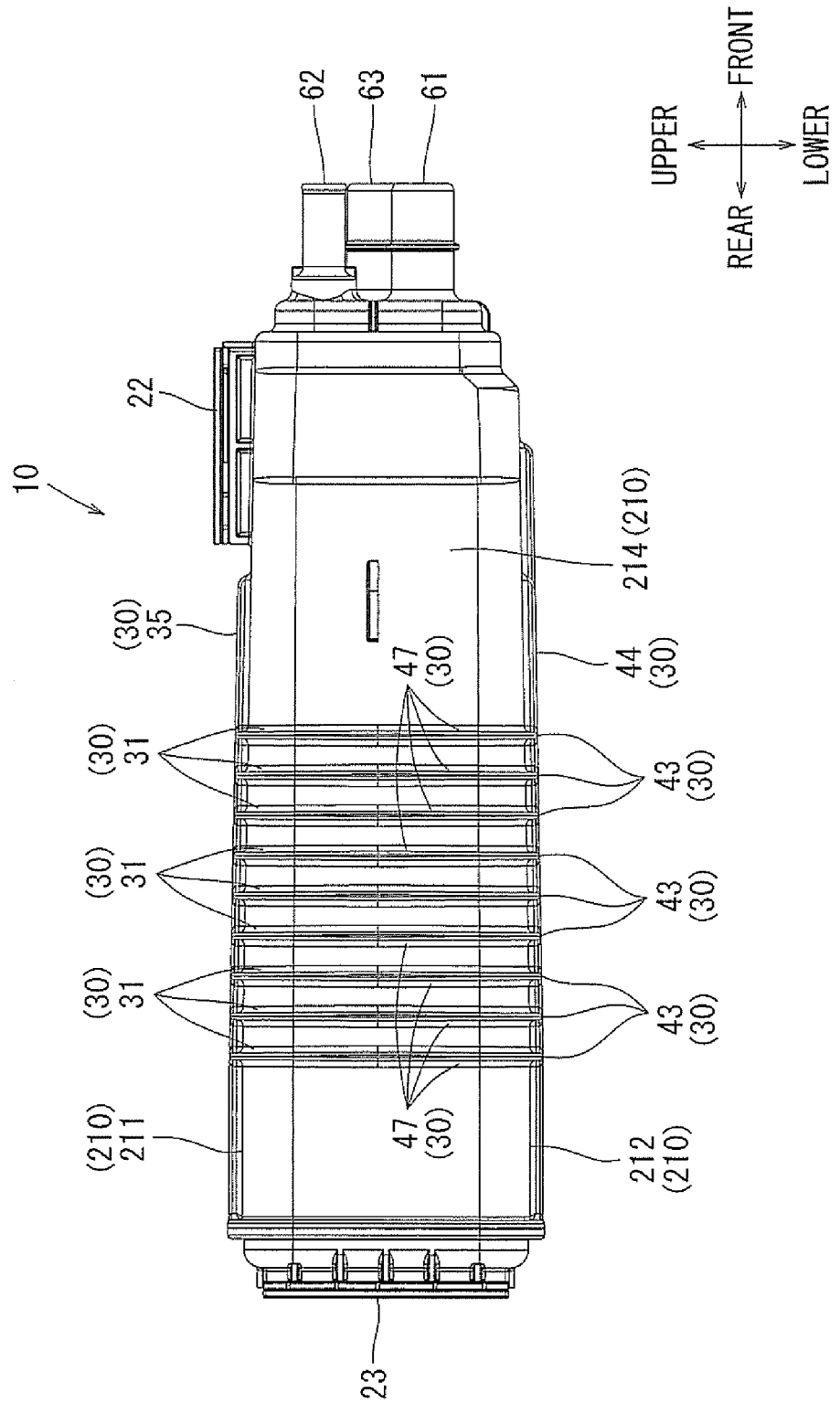
FIG. 5 is a right side view of the canister.
Figure 6:
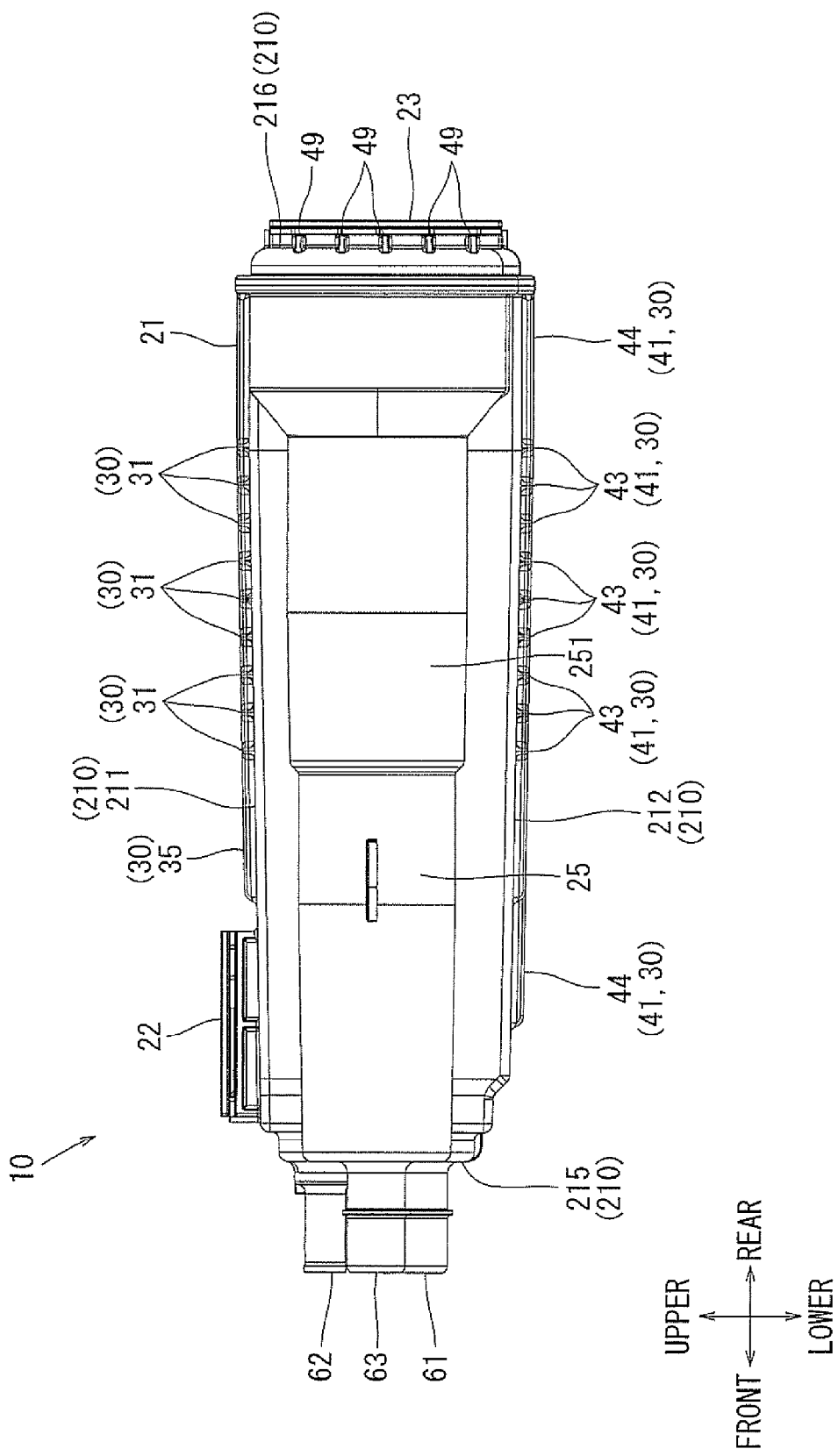
FIG. 6 is a left side view of the canister.
Figure 7:
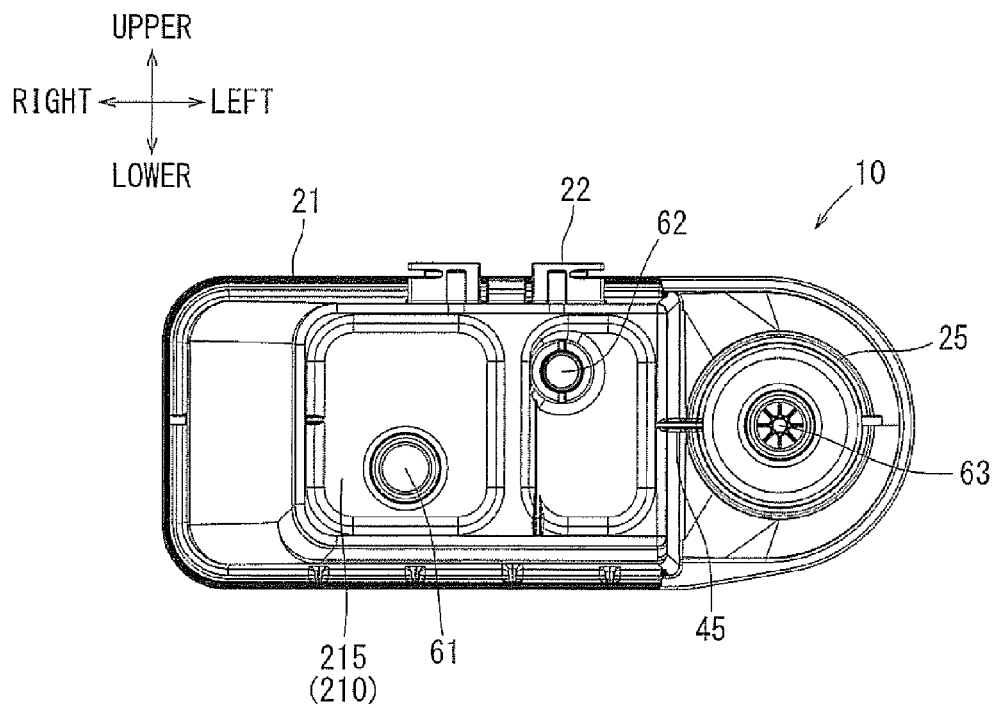
FIG. 7 is a front view of the canister.

As shown in FIG. 5, nine side ribs 47 are provided on the right surface 214 of the primary case body 21. The side ribs 47 extend in the vertical direction on the right surface 214 of the primary case body 21 and are parallel to each other at regular intervals. The side ribs 47 are included in the ribs 30. Each of the side ribs 47 protrudes rightward from the right surface 214 of the primary case body 21 and is formed in a linear shape. The side ribs 47 extend from an upper end to a lower end on the right surface 214 of the primary case body 21. That is, the side ribs 47 extend throughout the right surface 214 of the primary case body 21 in the vertical direction. The nine side ribs 47 are arranged in parallel to each other. Thus, the side ribs 47 do not intersect with each other and extend in the same direction, that is, in the vertical direction. The vertical direction where the side ribs 47 extend is perpendicular to the direction in which the tank port 61, the purge port 62, and the atmospheric port 63 are directed. That is, the vertical direction where the side ribs 47 extend is perpendicular to the flow directions F1 and F2 of the gasoline vapor. The nine side ribs 47 connect the nine parallel ribs 31 on the upper surface 211 of the primary case body 21 with the nine left-right ribs 43 on the lower surface 212 of the primary case body 21, respectively. That is, the nine side ribs 47 are connected to both the nine parallel ribs 31 and the nine right-left ribs 43.

Figure 8:
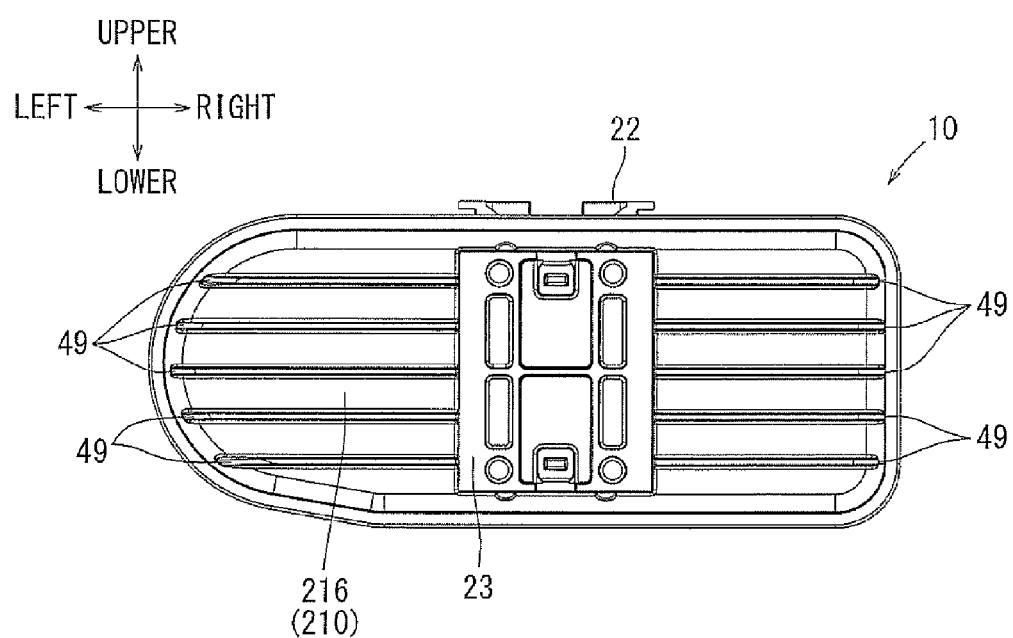
FIG. 8 is a rear view of the canister.

As shown in FIG. 8, five rear ribs 49 extend throughout the rear surface 216 of the primary case body 21 except the rear bracket fixing member 23 in the right and left direction. The rear ribs 49 extend in the right and left direction and are included in the ribs 30. The five rear ribs 49 are arranged parallel to each other at regular intervals on the rear surface 216 of the primary case body 21. That is, the rear ribs 49 do not intersect with each other and extend in the same direction, i.e., in the right and left direction. Each of the rear ribs 49 protrudes rearward from the rear surface 216 of the primary case body 21 and is formed in a linear shape. The rear ribs 49 extend to both a right end and a left end of the rear surface 216 of the primary case body 21.

Figure 9:
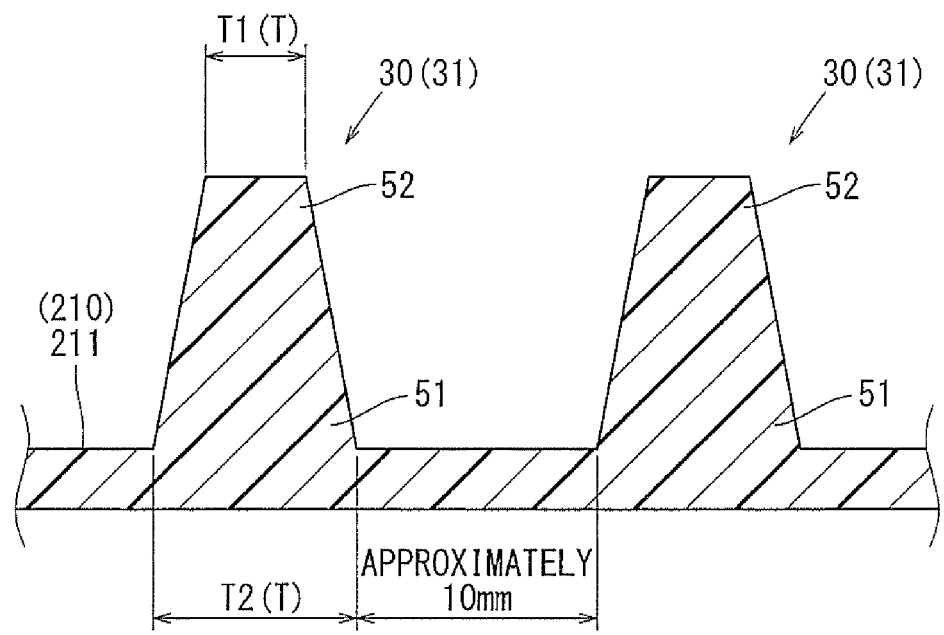
FIG. 9 is a cross-sectional view of ribs.

FIG. 9 is a cross-sectional view of a pair of the ribs 30. The cross-section of FIG. 9 is perpendicular to the direction where the ribs 30 extend. The ribs 30 include the parallel ribs 31, the crossing rib 35, the lattice rib 41, the side ribs 47 and the rear ribs 49, and each of the ribs 30 are formed to have the same cross-section shown in FIG. 9. With respect to each rib 30, the width T of the projection is formed to be broader toward a bottom portion 51 continued to the outer peripheral surface 210 of the primary case body 21. In detail, as shown in FIG. 9, the width T2 of the bottom portion 51 of the rib 30 is set to be broader (or larger) than the width T1 of the top end 52 of the rib 30. And, intervals between the ribs 30 adjacent to each other are usually set to be 7 mm or more, preferably 10 mm in this embodiment.

According to the above-described canister 10, following effects can be obtained. The canister 10 has the nine parallel ribs 31 and the crossing rib 35 on the upper surface 211 of the primary case body 21 such that the ribs 31 and 35 do not form any closed shape on the upper surface 211. Thus, when liquid such as water drops on the upper surface 211 of the primary case body 21, the liquid does not remain on the upper surface 211 of the primary case body 21 and can flow along the parallel ribs 31 in the right and left direction. That is, when the liquid drops on the upper surface 211 of the primary case body 21, it is able to flow the liquid in the right and left direction in order to remove the liquid from the upper surface 211 due to vibrations caused by the internal combustion engine of the vehicle or by vehicle traveling. Here, there is a possibility that the liquid may remain only on the upper surface 211 of the primary case body 21. On the other hand, the liquid does not remain on the lower surface 212, the left surface 213, the right surface 214, the front surface 215 and the rear surface 216 of the primary case body 21, and the periphery cylindrical surface 251 of the auxiliary case body 25. Thus, because it is able to prevent the liquid from remaining on the upper surface 211 of the primary case body 21, deterioration of the case 20 caused by the liquid remaining on the upper surface 211 of the primary case body 21 can be decreased. Here, the crossing rib 35 intersects with all of the nine parallel ribs 31. That is, the crossing rib 35 is formed as one rib shape, so that the rigidity of the crossing rib 35 can be improved. As a result, the rigidity of the case 20 can be increased.

In accordance with the above-described canister 10, because the lower surface 212 of the primary case body 21 has the lattice rib 41 protruding in the lattice shape, both the rigidity of the case 20 including the primary case body 21 and the heat exchange performance between the case 20 and the outside air can be improved. When the canister 10 is mounted on the vehicle, the upper surface 211 of the outer peripheral surface 210 of the primary case body 21 is directed upward. Thus, accumulation of the liquid on the upper surface 211 of the primary case body 21 can be appropriately prevented. The crossing rib 35 extends in the same direction as the tank port 61, the purge port 62 and the atmospheric port 63 of the case 20. Thus, the crossing rib 35 can be provided in a longer direction of the upper surface 211. And, the parallel ribs 31 can be provided to extend in the direction perpendicular to the longer direction of the upper surface 211. Accordingly, the upper surface 211 of the primary case body 21 has the nine parallel ribs 31 and the crossing rib 35. Therefore, while preventing the liquid such as water from remaining on the upper surface 211 of the primary case body 21, both the rigidity of the case 20 including the primary case body 21 and the heat exchange performance between the case 20 and the outside air can be improved.

According to the above-described canister 10, because the right surface 214 of the primary case body 21 has the side ribs 47, both the rigidity of the primary case body 21 and the heat exchange performance between the primary case body 21 and the outside air can be improved. And, because the nine side ribs 47 are connected to both the nine parallel ribs 31 and the nine right-left ribs 43, respectively, the rigidity of the side ribs 47 in a connection direction can be improved. Accordingly, the rigidity of the primary case body 21 can be improved. Because the width T1 of the top end of each rib 30 increases toward the bottom portion 51 continued with the outer peripheral surface 210 of the primary case body 21, the rigidity of each rib 30 can be improved. Because each interval between the ribs 30 adjacent to each other is set to be 7 mm or more, preferably 10 mm in this embodiment, the rigidity of a mold for shaping ribs 30 can be secured in order to stably form the ribs 30.

With respect to the ribs 30 provided on the outer peripheral surface 210 of the primary case body 21, the length of the parallel ribs 31 and the length of the right-left ribs 43 are set to be equal to the length (100%) of the outer peripheral surface 210 in the right and left direction. On the other hand, the length of the crossing rib 35 and the length of the front-rear ribs 44 are set to be equal to or greater than the half (50%) of the outer peripheral surface 210 in the front and rear direction. The ribs 30 having such configurations can sufficiently increase the rigidity of the case 20 including the primary case body 21 and can improve the heat exchange performance between the case 20 and the outside air.

Figure 10:
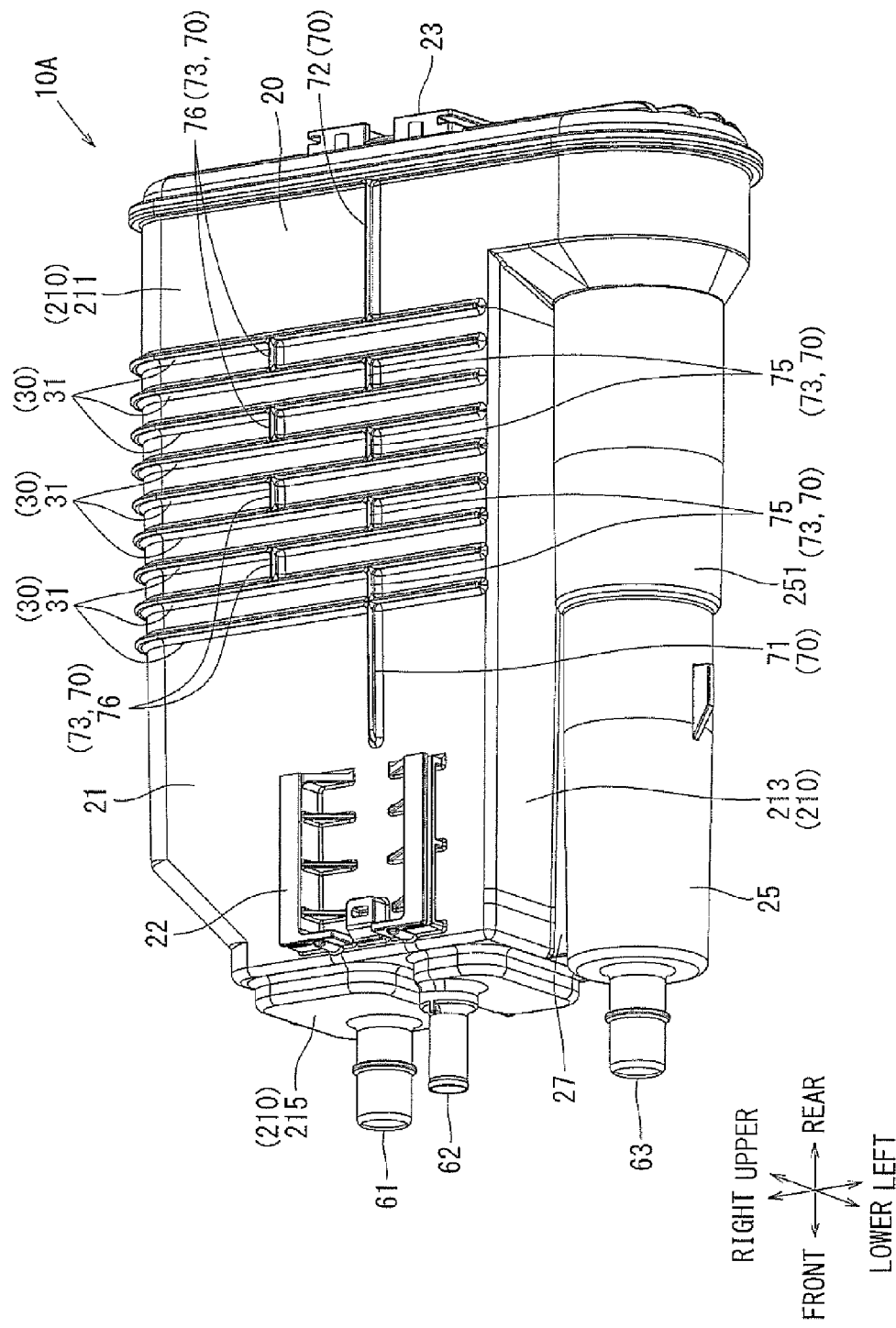
FIG. 10 is a perspective view of the upper side of the canister according to a second embodiment.

The canister 10A according to a second embodiment will be described in reference to FIG. 10. The following embodiments are identical to the first embodiment with some modifications. Thus, the modifications will be described, and other same (or shared) configurations will not be described. As shown in FIG. 10, the canister 10A has a front crossing rib 71, a rear crossing rib 72 and middle ribs 73. The front crossing rib 71, the rear crossing rib 72 and the middle ribs 73 are not aligned in the front and rear direction.

The front crossing rib 71 and the rear crossing rib 72 have the same configuration with a part of the crossing rib 35 of the first embodiment. In detail, the front crossing rib 71 is same with a front part of the crossing rib 35 in front of the parallel ribs 31. Whereas, the rear crossing rib 72 is same with a rear part of the crossing rib 35 behind the parallel ribs 31. Each of the middle ribs 73 is connected with the pair of the parallel ribs 71 adjacent to each other and protrudes from the upper surface 211 in a linear shape. One of the middle ribs 73 are provided between each pair of the parallel ribs 31 adjacent to each other. That is, two or more middle ribs 73 are not provided between the pair of the parallel ribs 31 adjacent to each other. The middle ribs 73 include left middle ribs 75, which are positioned to the left side, and right middle ribs 76, which are positioned to the right side. The left middle ribs 75 and the right middle ribs 76 are alternately arranged in the front and rear direction. Because each of the middle ribs 73 is connected to the pair of the parallel ribs 31 adjacent to each other and protrudes from the upper surface 211 in a linear shape, the crossing rib 70 of the second embodiment can produce similar effects to the crossing rib 35 of the first embodiment.

Figure 11:
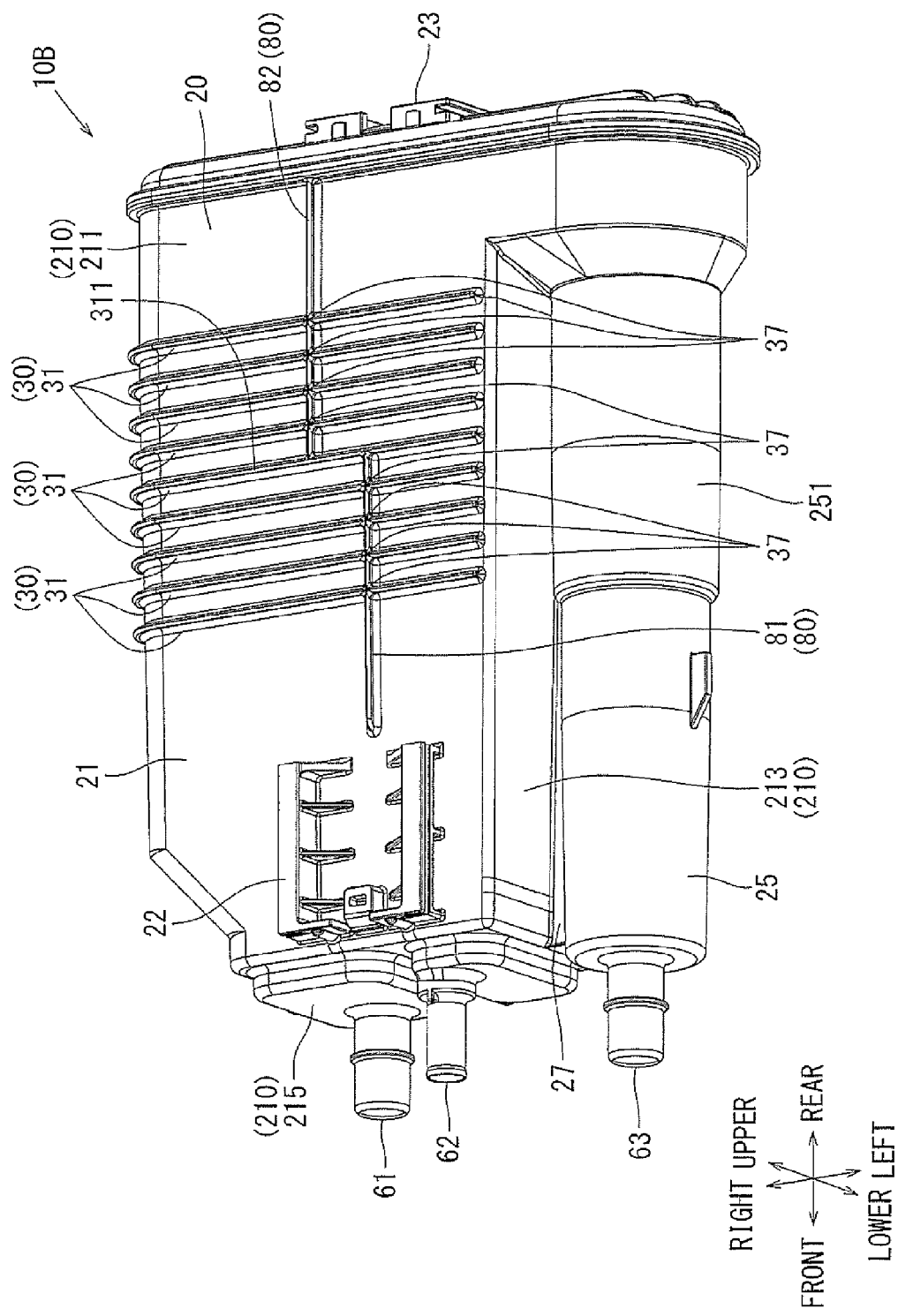
FIG. 11 is a perspective view of the upper side of the canister according to a third embodiment.

The canister 10B according to a third embodiment will be described in reference to FIG. 11. As shown in FIG. 11, the canister 10B has a crossing rib 80, which includes a front crossing rib 81 and a rear crossing rib 82. The parallel ribs 31 include a center rib 311. The front crossing rib 81 is positioned in front of the center rib 311, and the rear crossing rib 82 is positioned behind the center rib 311. Each of the front crossing rib 81 and the rear crossing rib 82 is formed in a linear shape, however the front crossing rib 81 and the rear crossing rib 82 are not linearly connected. The front crossing rib 81 is positioned to the left side, and the rear crossing rib 82 is positioned to the right side on the upper surface 211 of the primary case body 21. That is, the crossing rib 80 is divided into two pieces such that the front crossing rib 81 extends at the left side and the rear crossing rib 82 extends at the right side. Because the crossing rib 80 protrudes from the upper surface 211 and connects the parallel ribs 31 to each other, the crossing rib 80 of the third embodiment can produce similar effects to the crossing rib 35 of the first embodiment.

This disclosure is not limited to the above-described embodiments. For example, the primary case body 21 and the auxiliary case body 25 define an I-shaped flow passage therein.

The primary case body 21 can be formed in a hollow cylindrical shape or a hollow polygonal prism shape.

Further, the number of parallel ribs 31 can be altered. In addition, the parallel ribs 31 can be freely arranged without intersecting with each other. On the other hand, the position of the crossing rib is not limited to that perpendicular to the parallel ribs. The number of the crossing ribs located between the pair of the parallel ribs adjacent to each other is one or zero.

The invention claimed is:

1. A vaporized fuel processing apparatus for a vehicle having a fuel tank, the vaporized fuel processing apparatus comprising:
    a casing filled with an adsorbent and having a first outer surface;
    wherein the casing has first ribs protruding from the first outer surface and extending without intersecting with each other;
    wherein the casing has at least one second rib protruding from the first outer surface,
    wherein at least one pair of the first ribs adjacent to each other are connected with each other via one of the second ribs; and
    wherein the other pairs of the first ribs adjacent to each other are connected with each other via one of the second ribs only or are not connected with each other via any one of the second ribs.

2. The vaporized fuel processing apparatus according to claim 1,
    wherein all of the first ribs are connected via one of the second ribs only.

3. The vaporized fuel processing apparatus according to claim 1,
    wherein the casing is configured that when the vaporized fuel processing apparatus is mounted on the vehicle, the first outer surface is directed upward.

4. The vaporized fuel processing apparatus according to claim 3,
    wherein the casing has a second outer surface opposite to the first outer surface and has a lattice shaped rib protruding from the second outer surface.

5. The vaporized fuel processing apparatus according to claim 3,
    wherein the casing has a tank port for receiving vaporized fuel from the fuel tank, a purge port for sending the vaporized fuel, and an atmospheric port for communicating with the atmospheric air, and
    wherein the tank port, the purge port, and the atmospheric port are directed in a direction that is parallel to a direction that the second rib extends.

6. The vaporized fuel processing apparatus according to claim 4,
    wherein the casing has a third outer surface connecting the first outer surface with the second outer surface.

7. The vaporized fuel processing apparatus according to claim 6,
    wherein the casing has a side rib protruding from the third outer surface and being connected to the lattice shaped rib.

8. The vaporized fuel processing apparatus according to claim 1,
  wherein each of the first ribs and the second rib includes a cross-section having a bottom end continued to the first outer surface or the second outer surface and a top end opposite to the bottom end; and
  wherein the width of the cross-section increases from the top end toward the bottom end.

9. The vaporized fuel processing apparatus according to claim 1,
  wherein an interval between each pair of the first ribs adjacent to each other is equal to or greater than 7 mm.

\* \* \* \* \*